US008566808B2

(12) United States Patent  
Schreter

(10) Patent No.: US 8,566,808 B2
(45) Date of Patent: Oct. 22, 2013

(54) OBJECT STORAGE AND SYNCHRONIZATION HOOKS FOR OCCASIONALLY-CONNECTED DEVICES

(75) Inventor: Ivan Schreter, Leimen (DE)

(73) Assignee: SAP AG, Walldorf (DE)

( * ) Notice: Subject to any disclaimer, the term of this patent is extended or adjusted under 35 U.S.C. 154(b) by 1171 days.

(21) Appl. No.: 12/480,170

(22) Filed: Jun. 8, 2009

(65) Prior Publication Data

US 2009/0249315 A1 Oct. 1, 2009

Related U.S. Application Data

(62) Division of application No. 11/215,870, filed on Aug. 31, 2005, now Pat. No. 7,565,365.

(51) Int. Cl.
*G06F 9/44* (2006.01)

(52) U.S. Cl.
USPC .......................... 717/140; 717/142; 717/143

(58) Field of Classification Search
USPC ..................................... 717/140, 142–143
See application file for complete search history.

(56) References Cited

U.S. PATENT DOCUMENTS

| 6,286,028 | B1 |  | 9/2001 | Cohen et al. |  |
|---|---|---|---|---|---|
| 6,330,591 | B1 |  | 12/2001 | Ducaroir et al. |  |
| 7,047,259 | B1 |  | 5/2006 | Chasman et al. |  |
| 7,254,634 | B1 |  | 8/2007 | Davis et al. |  |
| 7,653,914 | B2 | * | 1/2010 | Krohn et al. | 719/328 |
| 2001/0052119 | A1 | * | 12/2001 | Inaba | 717/9 |
| 2002/0032822 | A1 | * | 3/2002 | Plummer et al. | 710/260 |
| 2004/0015840 | A1 | * | 1/2004 | Walker | 717/108 |
| 2005/0149914 | A1 | * | 7/2005 | Krapf et al. | 717/136 |
| 2007/0044069 | A1 | * | 2/2007 | Doucette et al. | 717/106 |

OTHER PUBLICATIONS

Oracle9i, "Oracle9i Lite Developers Guide for Windows 32", 2002, Oracle, p. 1-27.*
Javid Jamae, "Learn to Use the New Annotation Feature of Java 5.0", Feb. 10, 2005, http://www.devx.com/print/Java/Article/27235, p. 1-4.*

* cited by examiner

*Primary Examiner* — Li B Zhen
*Assistant Examiner* — Duy Khuong Nguyen
(74) *Attorney, Agent, or Firm* — Buckley, Maschoff & Talwalkar LLC

(57) ABSTRACT

A system may include an application programming interface (API) layer, a cache layer, and an object storage/access layer. The API layer may expose an interface to store a business object and an interface to retrieve the business object, and may transmit a request to store the business object and a request to retrieve the business object, and the cache layer may cache the business object and transmit the request to store the business object and the request to retrieve the business object. The object storage/access layer may receive the request to store the business object and, in response to the request to store the business object, to invoke a serialization method exposed by the business object to store the data associated with the object in a data structure. The object storage/access layer may also receive the request to retrieve the business object and, in response to the request to retrieve the business object, to invoke a deserialization method of the business object to deserialize the data associated with the business object in the data structure.

17 Claims, 10 Drawing Sheets

900 public class MyClass implements Persistable {

...

private String value1;

private boolean value2;

private int value4;

private double value5;

private float value7;

private int value8;

private long value9;

private short value0;

```
public class Contact implements SyncCapable {
    ...
    private int persNumber;
    private String firstName;
    private String lastName;
    private String professsion;
    private char sex;
    private Date birthday;
    private float weight;
    private float height;
    private String category1;
    private String category2;
    Collection addresses;     // detail rows
    Collection emails;        // detail rows
    ...
}
```

FIG. 10

OBJECT STORAGE AND SYNCHRONIZATION HOOKS FOR OCCASIONALLY-CONNECTED DEVICES

CROSS REFERENCE TO RELATED APPLICATION

This is a divisional of co-pending prior U.S. patent application No. 11/215,870, filed Aug. 31, 2005.

FIELD

Some embodiments relate to enterprise systems utilizing occasionally-connected devices. In particular, some embodiments are associated with storage of business objects within mobile devices and/or synchronization of the stored business objects with a back-end data store.

BACKGROUND

Mobile devices are increasingly used for executing business processes. Such business processes utilize and manipulate business data stored on the mobile devices. In one example, a delivery person may deliver a product to customers along an established route. The delivery person may use a mobile device to determine a product quantity and delivery schedule for each customer on the route, to enter new-orders and/or changes to existing orders, and to indicate successful delivery of an order. The mobile device must therefore receive business data from a back-end system that is specific to the route with which the mobile device is associated (e.g., product quantities, delivery schedules), as well as transmit business data (e.g., new and/or changed order information) to the back-end system for validation and storage therein.

FIG. 1 illustrates an internal software architecture of a mobile device which employs Java Data Object (JDO) persistency. As shown, mobile device 10 includes application 20 and database element 30. Application 20 provides the JDO Application Programming Interface (API) to business processes (not shown) executed by mobile device 10. Generally, the JDO API allows the business processes to store and to retrieve JDOs to and from database element 30 using a standard set of interfaces.

To store an object, a business process first invokes an appropriate interface of the JDO API. The object is cached and its data is serialized to an intermediate form using a database driver-specific Structured Query Language (SQL) serializer. The serialized data is passed to a database driver for transmission to database element 30. Database element 30 parses the received data and provides the parsed data to an access methods module. The module deserializes the data in its intermediate form and then serializes the data for storage in a database.

Conversely, retrieval of the data includes invoking an interface of the JDO API to request the corresponding object, passing the request through the cache, SQL serializer, the database driver, the parser, the access methods module, and to the database. The data is retrieved from the database, deserialized and serialized into the intermediate form using the access methods module. The serialized data is passed to a result builder for building an appropriate response to the request, through the database driver, a result parser, the cache and back to the business process via the JDO API. Such storage and retrieval of business data is unsuitably inefficient for many usage scenarios, including when resources are limited and/or when high performance is required.

Conventional systems also do not adequately address local storage and synchronization of business data between a mobile device and a back-end system. Synchronization issues arise because the nature of a mobile device to become occasionally-disconnected from its associated back-end system. The frequency and unpredictability of such disconnections create difficulties in keeping mobile devices up-to-date with respect to their associated data, and in maintaining an accurate record of the internal state of the mobile devices.

Improvements to the efficiency of mobile object data storage and/or synchronization are therefore desired.

BRIEF DESCRIPTION OF THE DRAWINGS

FIG. 9 illustrates object code of a business object marked with a first marker according to some embodiments.

FIG. 10 illustrates object code of a business object marked with a second marker according to some embodiments.

DETAILED DESCRIPTION

Figure 1:
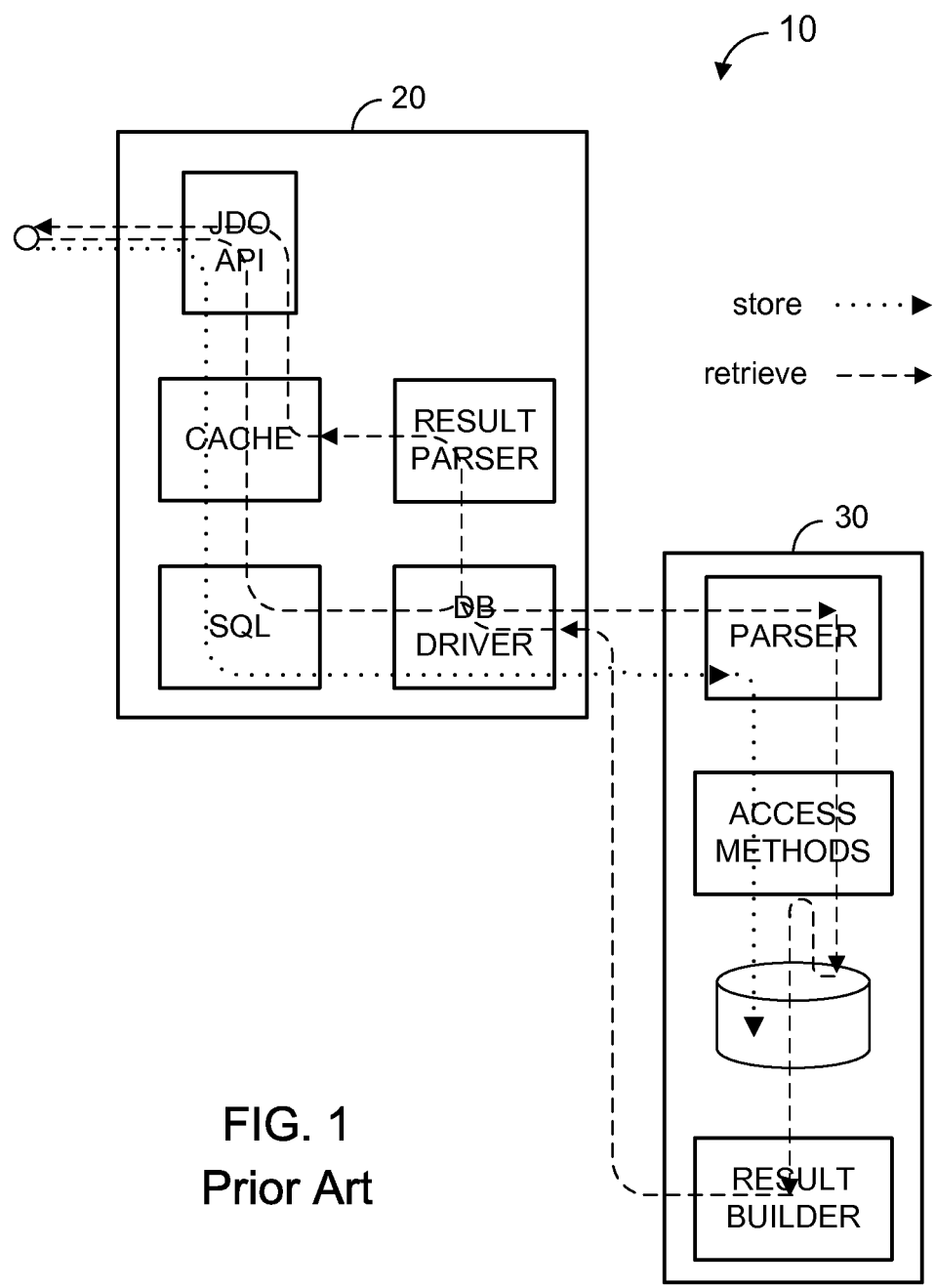
FIG. 1 is a block diagram of a prior art system for object storage in a mobile device.
Figure 2:
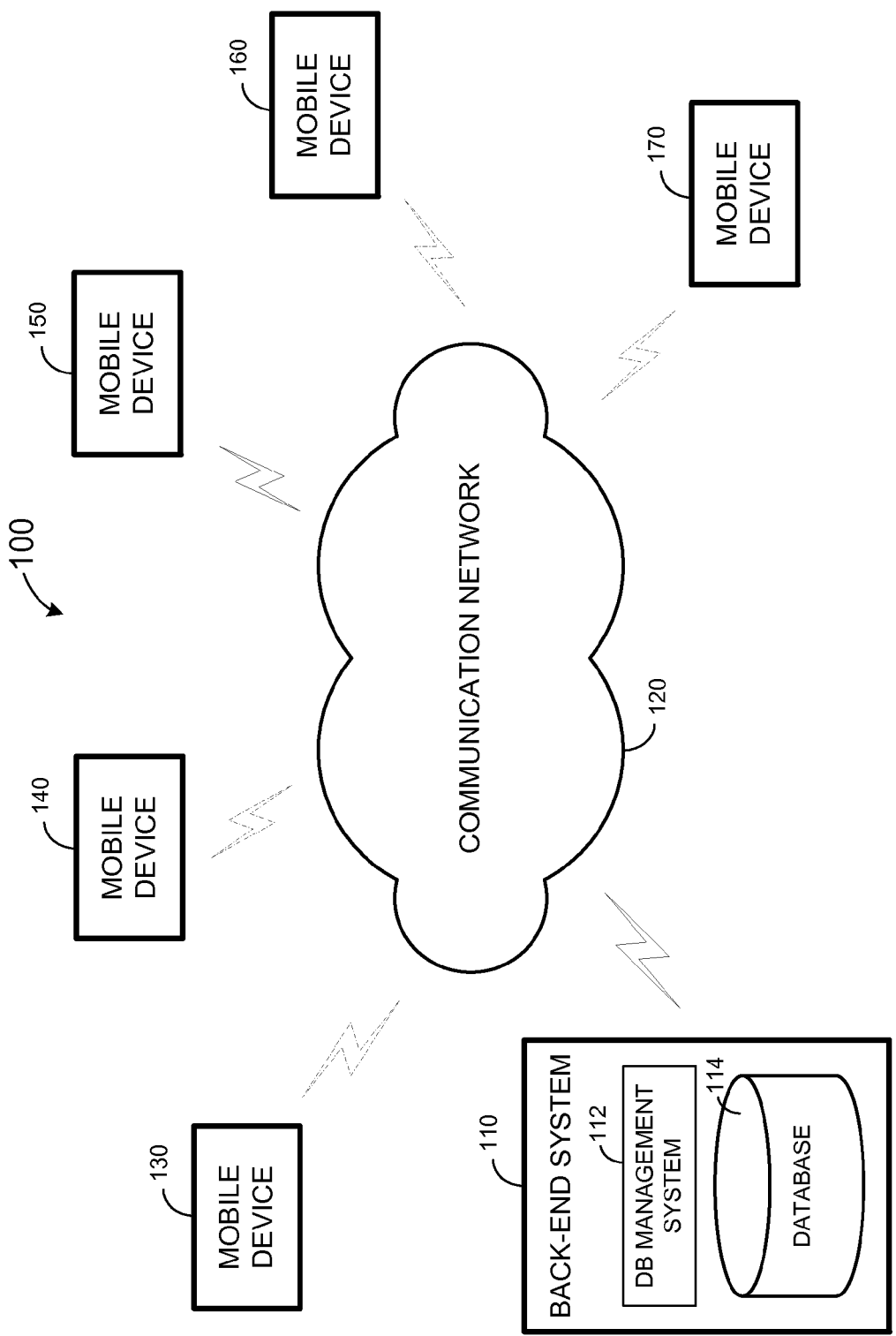
FIG. 2 is a block diagram of a system topology according to some embodiments.

FIG. 2 illustrates a topology of enterprise system 100 according to some embodiments. System 100 may, for example, provide management of business data among disparate and occasionally-connected mobile devices. System 100 includes back-end system 111 in communication with communication network 120. Also in communication with communication network 120 are mobile devices 130 through 170.

Back-end system 110 of FIG. 2 includes database management system (DBMS) 112 and database 114. DBMS 112 may comprise executable program code to retrieve data from database 114. Database 114 may comprise one or more disparate systems for storing data, therefore DBMS 112 may comprise one or more systems for retrieving stored data. According to some embodiments, database 114 is implemented as any suitable collection of data that may be accessed by a computer program to select particular data from the collection. Back-end system 110 may comprise other unshown elements to provide an enterprise system such as SAP R/3™ Enterprise Resource Planning system.

Back-end system 110 may also comprise any other suitable program code, scripts, or other functional data that is executable to interface with communication network 120 and mobile devices 130 through 170 as described herein. Back-end system 110 may comprise any combination of hardware, software, and/or firmware elements that may provide the functions that are attributed to a back-end system herein. Two or more of these elements may be located remotely from one another and may communicate with one another via communication network 120 and/or a dedicated connection.

As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP). Communication network 120 may therefore comprise any communication media and protocols that are or become known.

Mobile devices 130 through 170 may interact with business objects maintained by back-end system 110. Mobile devices 130 through 170 may generate, access and/or modify identical, overlapping, or completely different sets of business objects depending on their respective data subscriptions. Continuing with the example from the Background, a business object (BO) may comprise an order placed by a customer and may therefore be associated with the one of mobile devices 130 through 170 that is assigned to a delivery route to which that customer belongs. Back-end system 110 may provide conflict resolution and synchronization services natively and/or via middleware (not shown).

Mobile devices 130 through 170 may comprise any of a laptop, a personal digital assistant, a tablet computer, a handheld computer, a cellular telephone, a dedicated mobile device, and any other suitable mobile device or devices that are or become known. As mentioned above, mobile devices 140 through 170 may occasionally connect to back-end system 110 directly or via communication network 120.

Figure 3:
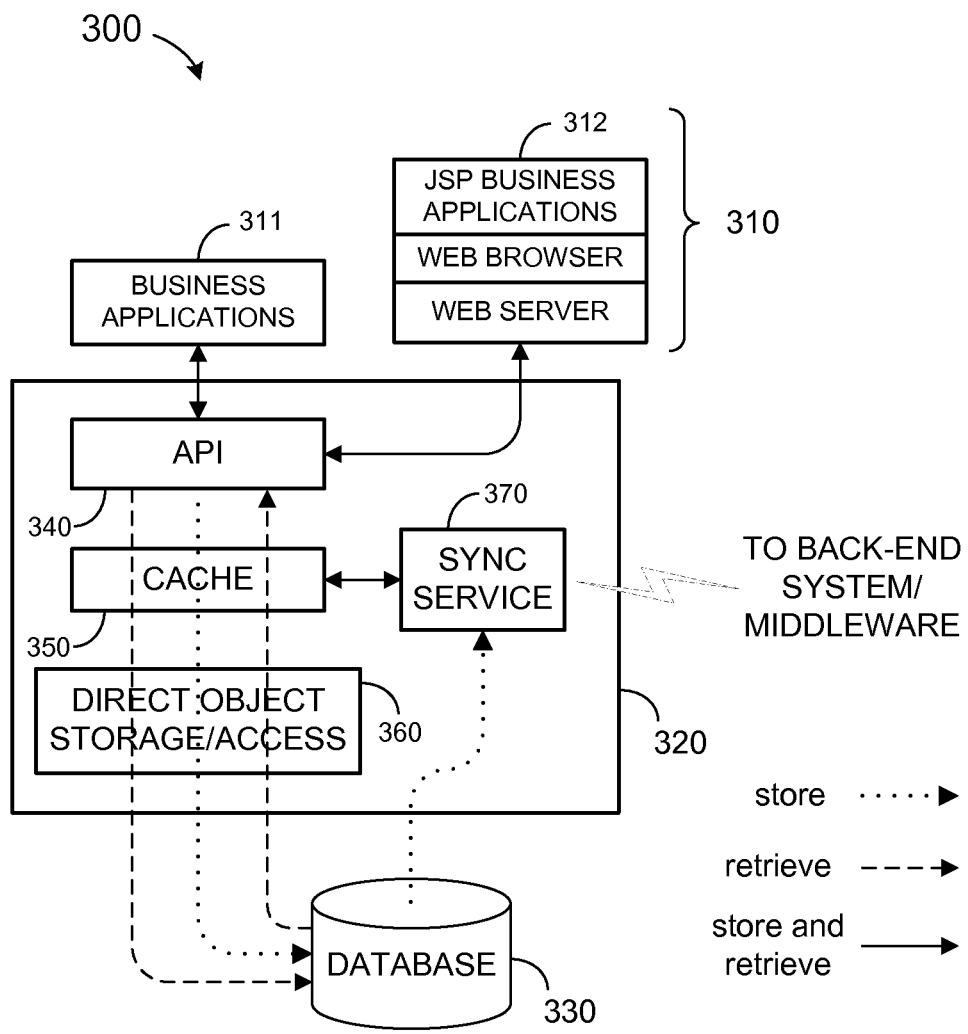
FIG. 3 is a block diagram of a software architecture according to some embodiments.

FIG. 3 illustrates software architecture 300 for a mobile device according to some embodiments. Software architecture 300 may be used in conjunction with one or more of mobile devices 130 through 170 according to some embodiments. Embodiments are not limited to architecture 300, and architecture 300 may be implemented in any currently- or hereafter-known manner. For example, each illustrated software element may be embodied as services, layers, and/or core components of an associated operating environment, and/or may be embodied by any other executable software component, including a dynamic link library or a stand-alone application.

Elements of architecture 300 may operate to receive a request to store a business object, cache the business object, invoke a serialization method of the business object to serialize data associated with the business object, and store the serialized data in a data structure in association with the business object. Elements of architecture 300 may also operate to receive information regarding the storage of the business object, and determine changes to the data stored in association with the business object. Conversely, embodiments may receive a request to retrieve a business object, retrieve serialized data associated with the business object from a data structure, invoke a deserialization method of the business object to deserialize the data, and return the business object with the deserialized data.

Architecture 300 includes business processes 310 interacting with system 320 in order to store data in and retrieve data from database 330. Business processes 310 may generate, access and/or modify business objects according to some embodiments. A business object as discussed herein may refer to a particular instance of a business object that is associated with particular data.

Business processes 310 may transmit requests to store business objects in and/or retrieve business objects from database 330. Business processes 310 may comprise standalone business applications 311 and application stack 312. Application stack 312 may include business applications written in Java Server Pages (JSP) format, a Web browser to provide user interface rendering for such applications, and a Web server to provide an execution environment (e.g., a Java Virtual Machine) for the JSP business applications. Any suitable business process that is or becomes known may be used in conjunction with some embodiments.

System 320 includes API layer 340, cache layer 350, direct object storage/access layer, and synchronization service layer 370. API layer 340 may expose an interface to store a business object and an interface to retrieve the business object, and may transmit a request to store the business object and a request to retrieve the business object. Interfaces exposed by API layer 340 may comply with the JDO API specification, but embodiments are not limited thereto. In a case that API layer 340 exposes such complying interfaces, actions associated with the interfaces exposed by API layer 340 may differ markedly from those required by the JDO API specification.

Cache layer 350 provides access to underlying persistence implementation layer 360. Cache layer 350 may also or alternatively store a number of recently-used objects to provide quick access thereto. In some embodiments, cache layer 350 may cache a to-be-stored business object and transmit a request to store the business object. Cache 350 may also or alternatively transmit a request to retrieve the business object. Details of cache 350 according to some embodiments are provided below.

Direct object storage/access layer 360 may receive request to store the business object from cache layer 350 and, in response, may invoke a serialization method exposed by the business object to store data associated with the business object in database 330. Direct object storage/access layer 360 may also receive a request to retrieve the business object from cache layer 350 and, in response to the request to retrieve the business object, invoke a deserialization method of the business object to deserialize the data associated with the business object in the database 330.

Synchronization service layer 370 may receive information from cache 350 regarding the storage of a business object in database 330. Synchronization service layer 370 may use this information to determine changes to the data associated with the business object. The determined changes may be used to synchronize the data stored in database 330 with the data stored in association with the business object in database 114 of back-end system 110. Synchronization service 370 may be designed with respect to a generic synchronization abstraction and may therefore be capable of providing synchronization services to systems other than system 320.

Figure 4:
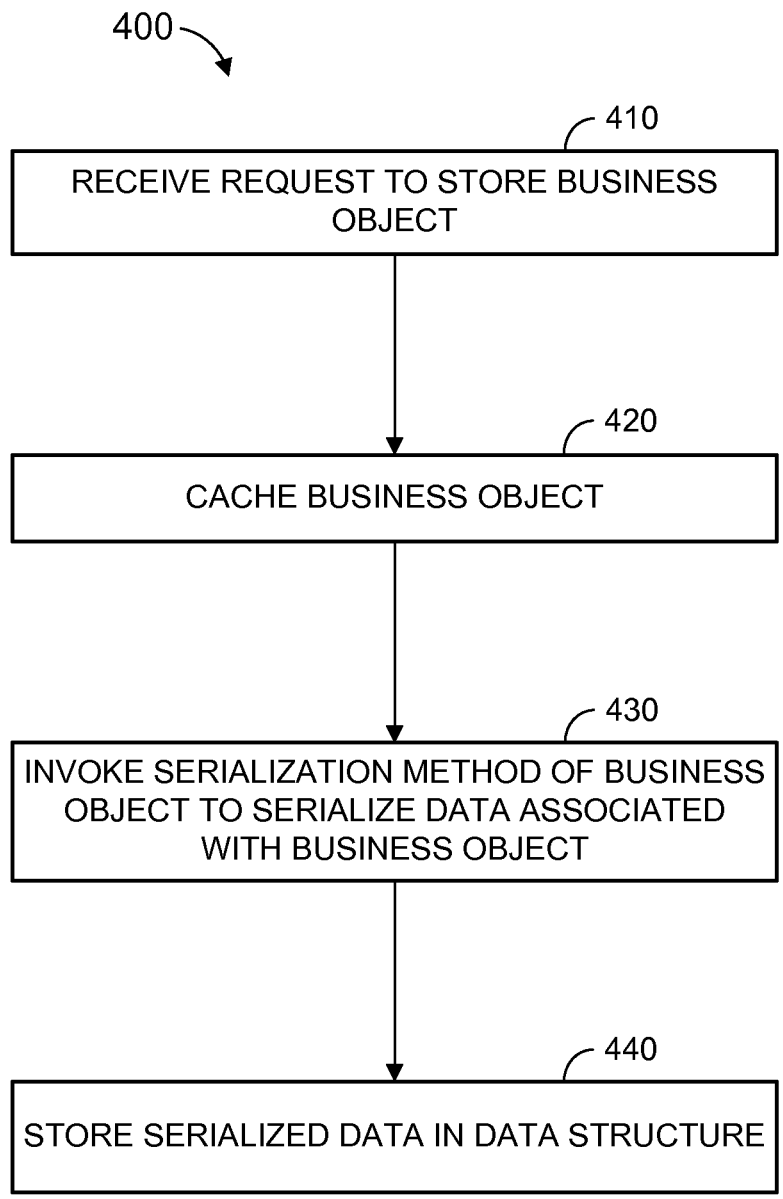
FIG. 4 is a flow diagram of process steps to store data associated with a business object according to some embodiments.

FIG. 4 is a flow diagram of process 400 to store data associated with a business object according to some embodiments. Process 400, as well as the other processes described herein, may be performed by any combination of hardware, software, and firmware. Process 400 will be described below as if executed by system 320 of FIG. 3, but embodiments are not limited thereto.

Initially, a request to store a business object is received at 410. In one example, business process 311 invokes an interface exposed by API layer 340. The invocation passes a business object to API layer 340 and comprises a request to store the business object in database 330. As described above, the business object is a particular instance of a business object, and includes data associated with the particular instance. The received request may also indicate that the business object implements one or more methods that may be used at 430 as described below.

The business object is cached at 420. Cache layer 350 may cache the object until storage of the business object is complete. Cache layer 350 also provides access to direct object/storage access layer 360. According to some embodiments described below, cache layer 350 provides information to sync service 370 that may be used to determine changes to database 330 since a last synchronization with back-end system 110. The business object itself may include one or methods that may be invoked to provide the information. Inclusion of these methods in the business object according to some embodiments will be described below.

Next, at 430, a serialization method of the business object is invoked. The serialization method serializes data associated with the business object. Accordingly, the business object includes one or more methods for serializing its own data. In some embodiments, such methods are added to the business object during compilation thereof using a class rebuilder as will be described below with respect to FIGS. 7 through 9. Direct object/storage access layer 360 may invoke the serialization method at 430 according to some embodiments.

The serialized data is stored in a data structure at 440. In the present example, direct object/storage access layer 360 stores the serialized data in database 330 in association with the business object. Such storage may comprise storing an identifier of the business object (instance) in association with the serialized data in database 330. Direct object/storage access layer 360 may store the data in any form and using any database management protocol that might govern database 330.

According to some embodiments, database 330 provides information to synchronization service 370 after 440. Synchronization service 370 may use the information to determine changes to the data stored in database 330. Again, such changes may be used to synchronize the data stored in association with the stored business object in database 330 with the data stored in association with the stored business object in database 114 of back-end system 110.

Figure 5:
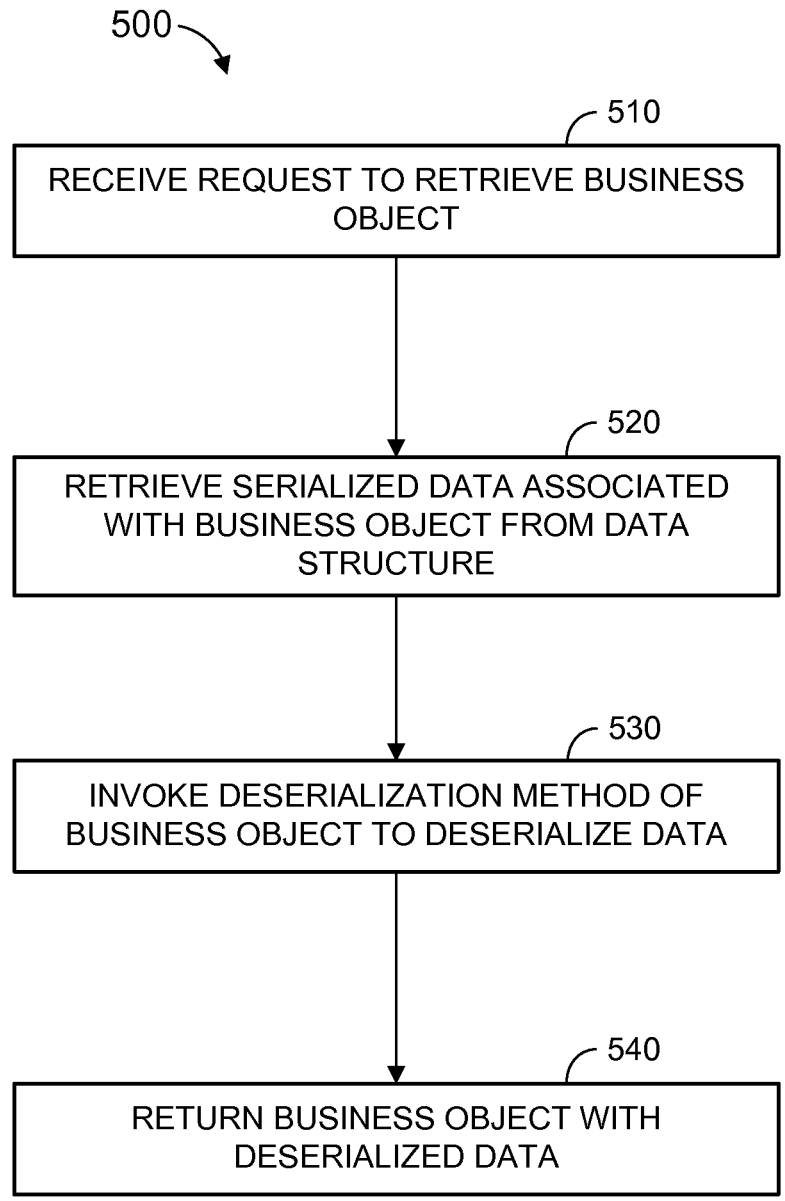
FIG. 5 is a flow diagram of process steps to retrieve data associated with a business object according to some embodiments.

FIG. 5 is a flow diagram of process 500 to retrieve a stored business object according to some embodiments. The business object may be stored in database 330.

At 520, a request to retrieve a business object is received. For example, business process 312 may invoke an interface exposed by API layer 340 at 520. The invocation identifies a business object and comprises a request to retrieve the business object from database 330. More particularly, the invocation comprises a request to retrieve serialized data associated with an instance of the business object and stored in database 330. The request may also indicate, using the invoked interface, another interface, or any other means, that the business object includes one or more methods that may be used as will be described below with respect to 530.

The serialized data is retrieved from the data structure at 520. In the present example, direct object/storage access layer 360 retrieves the serialized data from database 330 using an identifier of the business object that was passed in the request. Direct object/storage access layer 360 may retrieve the data using any database management protocol that is compatible with database 330.

A deserialization method of the business object is then invoked at 530. Direct object/storage access layer 360 may invoke the serialization method at 430 according to some embodiments. The deserialization method deserializes the retrieved data into an appropriate object format. Accordingly, the business object includes one or more methods for deserializing its own data. These methods may be added to the business object during compilation as will be described below.

The business object, including the deserialized data, is returned to the requesting entity at 540. The return may comprise a callback to business process 312 managed by API layer 340.

Figure 6:
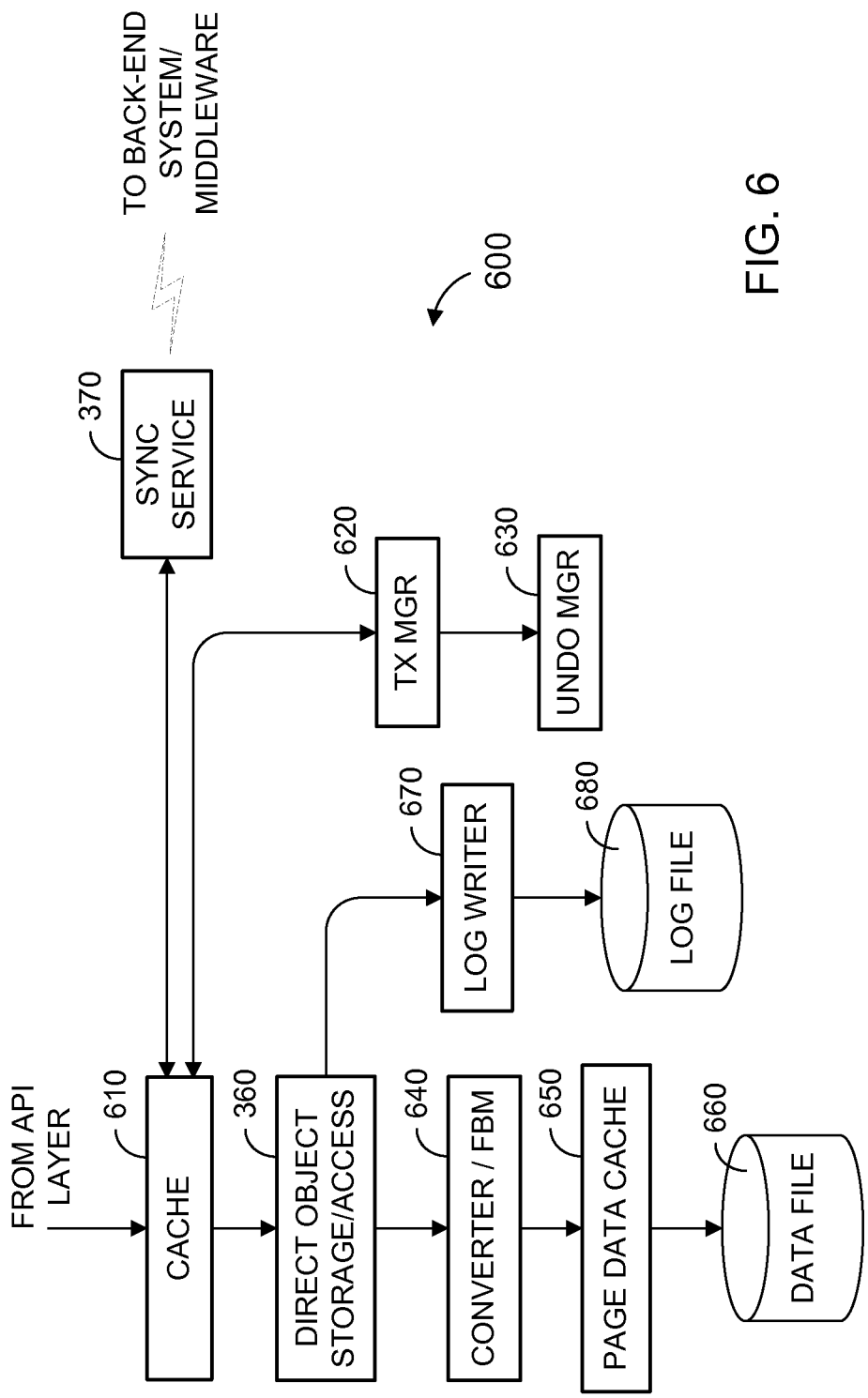
FIG. 6 is a block diagram of a software architecture according to some embodiments.

FIG. 6 illustrates software architecture 600 for a mobile device according to some embodiments. Software architecture 600 may comprise a particular implementation of architecture 300 of FIG. 3, but embodiments are not limited thereto. Elements of architecture 600 may be implemented in any currently- or hereafter-known manner, including those described above with respect to architecture 300.

Cache layer 610, as described above with respect to cache layer 350, may cache a to-be-stored business object, transmit a request to store the business object, transmit a request to retrieve the business object, and/or store a number of recently-used objects to provide quick access thereto. In some embodiments, cache layer 610 also indicates whether a business object includes methods for serializing and deserializing itself. Cache layer 610 may also indicate whether the business object includes methods for providing its own synchronization information to synchronization service 620.

Figure 7:
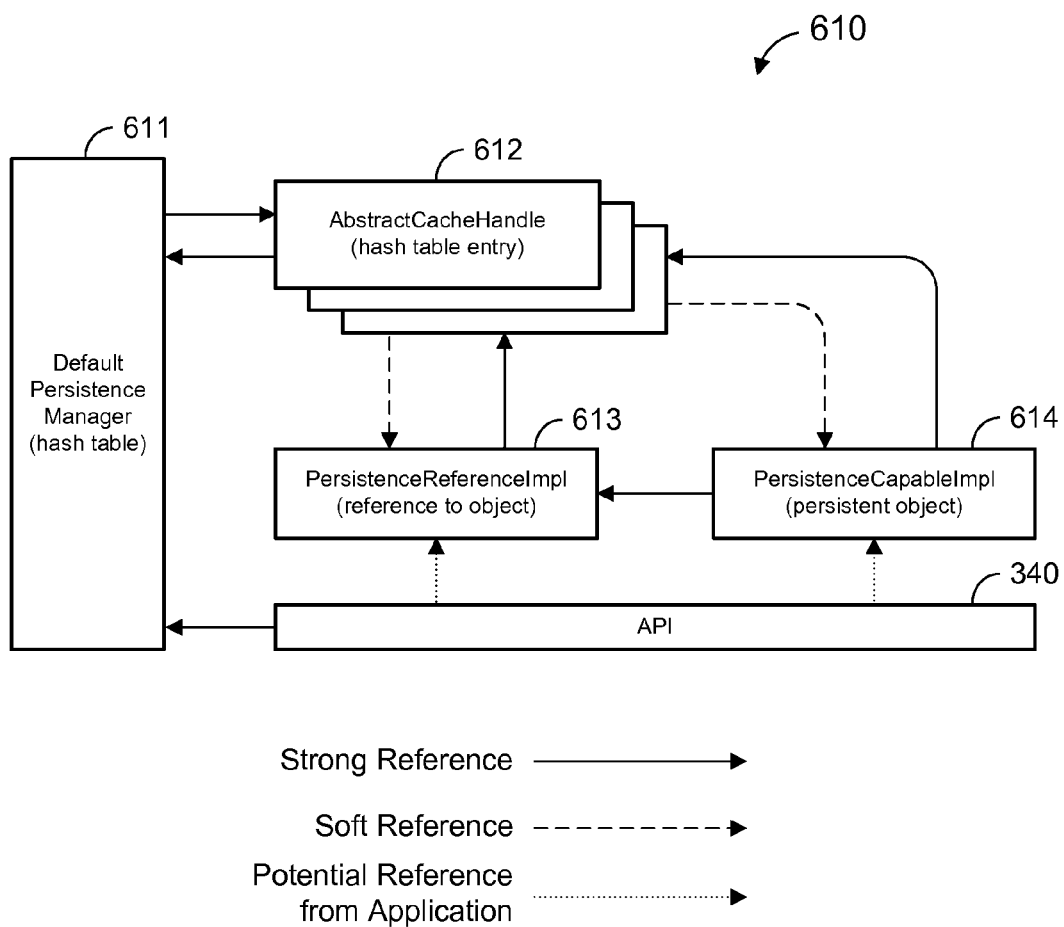
FIG. 7 is a block diagram of an object cache architecture according to some embodiments.

FIG. 7 is a block diagram of a portion of cache layer 610 according to some embodiments. Cache layer 610 is in communication with business processes 310 through API layer 340. API layer 340 may provide business object information to cache layer 610 that is used to modify elements 611 through 614.

Default persistence manager 611 may comprise a hash table for tracking all or a subset of business objects of business processes 310 and/or stored in database 330. Each object in the database 330 "cache" is associated with a reference via persistent reference implementation 613 and with a cache handle object via element 612. The cache handle object holds soft references to persistent reference implementation 613 and to persistent object 614. These soft references can be dropped by a garbage collector to conserve memory.

The cache handle object is registered with a reference queue associated with persistence manager 611. Persistence manager 611 drops cache handles from its hash when associated objects have been dropped. If an application holds a strong reference to an object, then the garbage collector cannot remove the object and reference. If an application holds a strong reference to a persistent reference implementation (i.e., OID) of an object, then the object may be garbage-collected because it can be reloaded from persistence. The foregoing may also hold for persistent objects reachable from other persistent objects, since Java references are re-written with PersistentReference internally. Thus, even if an application strongly references persistent object A, while A strongly references persistent object B, B can be removed from cache, since the strong reference from A to B is re-written as a strong reference to PersistentReference of B and thus B itself is held only via soft reference.

All not yet-flushed modified objects are additionally strongly referenced from persistence manager 611 in order to hold the objects in memory. In order to allow the user to store PersistentReference instances across persistence managers, persistence manager 611 will clone the reference for internal purposes in getObjectById, if needed (e.g., if the reference points to another persistence manager). If the reference is not associated with a cache handle object, then it will become a new synchronized cache handle object. Persistence manager 611 may also clear all cache handle objects and references on commit/rollback, so the reference may be reused after commit/rollback to dereference objects.

Returning to architecture 600, several other elements are present that were not previously described with respect to architecture 300. These elements include transaction manager 620 and undo manager 630. Transaction manager 620 and undo manager 630 are in communication with cache layer 610 to facilitate persistence management.

More specifically, transaction manager 620 may manage the object storage and retrieval transactions described above. Such management may include changes made to a business object by a first transaction are visible to a second transaction only after the changes have been committed. To avoid conflict, transaction manager may also prevent a transaction from changing a business object once the business object is changed by a concurrent transaction. Transaction manager 620 may also restore a prior version of a business object based on an "undo" file.

Transaction manager 620 may provide undo files to undo manager 630 when new data is committed to database 330. Undo manager 630 therefore manages the undo files, which may include purging the undo files according to an established protocol.

Converter/Free Block Manager 640 may provide layer 360 with logical-to-physical page ID mapping, fixed and floating logical page allocation, savepoint support, and management of physical page state and state transitions. In addition, page data cache 650 may cache the physical pages, read and write the physical pages, and provide temporary pages for "scratch space". The page data is stored in data file 660.

Log writer 670 may comprise a write-ahead log writer which layer 360 uses to store a log of each changing operation in log file 680 prior to executing the operation. In some embodiments, log writer 670 and log file 680 provide support for savepoints by storing dirty pages and special log records for a savepoint, and by indexing the savepoint in a restart record. Accordingly, on a restore, the indexed savepoint may be read and restored based on its associated log records. Database 330 of architecture 300 may comprise log file 680 and data file 660 according to some embodiments.

Figure 8:
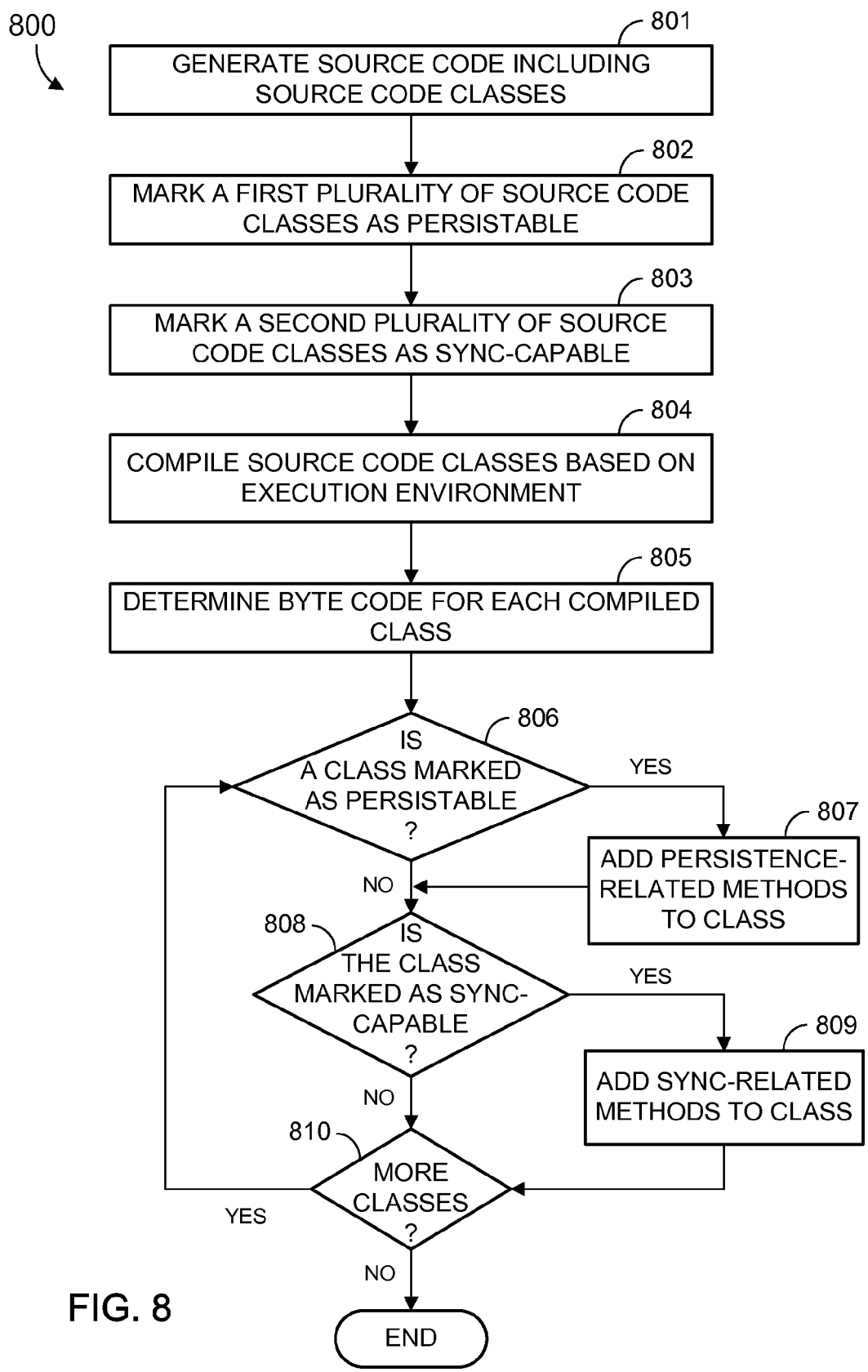
FIG. 8 is a flow diagram of process steps to generate business objects according to some embodiments.

FIG. 8 illustrates a flow diagram of process 800 to generate business objects according to some embodiments. Process 800 may be executed by a any one or more devices, including but not limited to a developer's workstation.

Source code including source code classes is generated at 801. The source code classes may comprise source code of Java classes and a portion of a business process to be executed by a mobile device. One or more of the source code classes may comprise a business object as described above. In this regard, one or more of the source code classes may define data to be associated with an instantiation thereof.

The source code may comprise any code that may be compiled for execution in any execution environment. The source code may be generated by any platform in which source code may be developed. The code may comprise ASCII characters formatted according to the Java programming language, but embodiments are not limited thereto.

Next, at 802, a first plurality of the source code classes is marked as persistable. In some embodiments, such a marking indicates that the first plurality of classes are to include one or more methods to serialize and deserialize itself. Persistence-related methods will be described in more detail below.

FIG. 9 illustrates a source code class that is marked according to some embodiments of 802. As shown, source code class 900 implements the empty interface "Persistable". Marking at 802 may therefore comprise specifying that class 900 implements this particularly empty interface. Any suitable type of marker may be employed at 802. Each of the first plurality of the source code classes is similarly marked in some embodiments.

A second plurality of source code classes is marked as sync-capable at 803. This marking may indicate that each of the second plurality of classes is to include one or more methods to provide its own synchronization information to a synchronization service. The second plurality of source code classes may or may not be mutually exclusive with the first plurality of source code classes. That is, a single source code class may be marked as persistable at 802 and sync-capable at 803. According to some embodiments, the sync-capable marking effectively marks a class as sync-capable and persistable. The sync-capable marking therefore indicates that the class is to include one or more methods to serialize and deserialize itself as well as one or more methods to provide its own synchronization information to a synchronization service.

Source code class 1000 of FIG. 10 is marked according to some embodiments of 803. As shown, class 1000 implements the empty interface "SyncCapable". Any suitable type of marker may be employed for each of the second plurality of the source code classes at 803.

The generated source code classes, including the first plurality of classes, the second plurality of classes, and perhaps other classes, is compiled at 804. Compiling proceeds with respect to the environment in which the compiled code is to be executed. In other words, the compiler used at 804 is intended to produce code that may be executed in the intended execution environment.

After compilation at 804, a byte code is determined for each compiled class at 805. The byte code for a class indicates whether the class was marked at 802 and/or 803. A class rebuilder may be executed at 805 to determine the respective byte codes. Such a class enhancer may also execute 806 through 810 as described below according to some embodiments.

Next, at 806, it is determined whether one of the compiled classes was marked as persistable. This determination may be based on a byte code associated with the compiled class. If the byte code indicates that the class was marked as persistable, persistence-related methods are added to the class at 807. The persistence-related methods may be accessed only by direct object storage/access layer 360 in some embodiments. According to some embodiments, the persistence-related methods include:

makePersistent(Object): PersistentReference
deletePersistent(Object)
getObjectId(Object): PersistentReference
getObjectById(PersistentReference): Object
getIterator(Class, Boolean): Iterator
lockObject(Object)
currentTransaction( ): Transaction Flow proceeds to 808 after 807 or if the determination at 806 is negative. It is determined at 808 whether the subject compiled class was marked as sync-capable at 803. Again, this determination may be based on a byte code associated with the compiled class. Synchronization-related methods are added to the class at 809 if it is determined that the class was marked as sync-capable. The synchronization-related methods may comprise one or more methods that provide information associated with changes to an instantiation of the class.

Flow proceeds to 810 after 809 or a negative determination at 808. If other compiled classes have not yet been evaluated at 806 and 808, flow returns to 806 and proceeds as described above for a second compiled class. Flow therefore cycles from 806 through 810 until each compiled class includes one of, both of, or neither of the persistence-related methods and the synchronization-related methods. Process 800 thereafter terminates.

The class-enhancement of process 800 may occur at any suitable time. For example, process 800 may be executed at compilation time, deployment time, and/or at class loading time (runtime). Embodiments, of course, are not limited thereto.

The embodiments described herein are solely for the purpose of illustration. Those skilled in the art will recognize other embodiments may be practiced with modifications and alterations limited only by the claims.

What is claimed is:

1. A method, comprising:
    marking a first plurality of source code classes with a first marker;
    compiling the first plurality of source code classes;
    identifying the compiled classes as marked with the first marker;
    for each identified compiled class, adding a first interface to the identified compiled class to serialize data associated with an instance of the identified compiled class;
    for each identified compiled class, adding a second interface to the identified compiled class to deserialize serialized data associated with an instance of the identified compiled class;
    wherein the first marker is a name of an empty interface implemented by each of the first plurality of source code classes; and
    wherein identifying the compiled classes as marked with the first marker comprises:
    identifying a byte code associated with each of the compiled classes, wherein the byte code is associated with the first marker.

2. The method according to claim 1, wherein the first interface is to store the serialized data in a data structure in association with the instance of the identified compiled class, and wherein the second interface is to retrieve the serialized data from the data structure.

3. The method according to claim 1, further comprising:
    marking a second plurality of source code classes with a second marker;
    compiling the second plurality of source code classes;
    identifying the second compiled classes as marked with the second marker; and
    for each identified second compiled class, adding a third interface to the identified second compiled class to track synchronization information associated with an instance of the identified second compiled class.

4. The method according to claim 3, wherein the first plurality of classes and the second plurality of classes are not mutually exclusive.

5. The method according to claim 3, wherein identifying the compiled classes as marked with the first marker comprises:
    identifying a first byte code associated with each of the compiled classes, the first byte code associated with the first marker, and
    wherein identifying the second compiled classes as marked with the second marker comprises:
    identifying a second byte code associated with each of the second compiled classes, the second byte code associated with the second marker.

6. A non-transitory computer-readable medium storing program code, the program code comprising:
    code to mark a first plurality of source code classes with a first marker;
    code to compile the first plurality of source code classes;
    code to identify the compiled classes as marked with the first marker;
    code to add, for each identified compiled class, a first interface to the identified compiled class to serialize data associated with an instance of the identified compiled class;
    code to add, for each identified compiled class, a second interface to the identified compiled class to deserialize serialized data associated with an instance of the identified compiled class;
    wherein the first marker is a name of an empty interface implemented by each of the first plurality of source code classes; and
    wherein the code to identify the compiled classes as marked with the first marker comprises:
    code to identify a byte code associated with each of the compiled classes, wherein the byte code is associated with the first marker.

7. The medium according to claim 6,
    wherein the first interface is to store the serialized data in a data structure in association with the instance of the identified compiled class, and
    wherein the second interface is to retrieve the serialized data from the data structure.

8. The medium according to claim 6, further comprising:
    marking a second plurality of source code classes with a second marker;
    compiling the second plurality of source code classes;
    identifying the second compiled classes as marked with the second marker; and
    for each identified second compiled class, adding a third interface to the identified second compiled class to track synchronization information associated with an instance of the identified second compiled class.

9. The medium according to claim 8, wherein the first plurality of classes and the second plurality of classes are not mutually exclusive.

10. The medium according to claim 8, wherein the code to identify the compiled classes as marked with the first marker comprises:
    code to identify a first byte code associated with each of the compiled classes, the first byte code associated with the first marker, and
    wherein the code to identify the second compiled classes as marked with the second marker comprises:
    code to identify a second byte code associated with each of the second compiled classes, the second byte code associated with the second marker.

11. A system comprising:
    a device that comprises at least one processor and is configured to:
    mark a first plurality of source code classes with a first marker;
    compile the first plurality of source code classes;
    identify the compiled classes as marked with the first marker;
    for each identified compiled class, add a first interface to the identified compiled class to serialize data associated with an instance of the identified compiled class;

for each identified compiled class, add a second interface to the identified compiled class to deserialize serialized data associated with an instance of the identified compiled class;

wherein the first marker is a name of an empty interface implemented by each of the first plurality of source code classes; and wherein the identify the compiled classes as marked with the first marker comprises:

identify a byte code associated with each of the compiled classes, wherein the byte code is associated with the first marker.

12. The system according to claim 11, wherein the device executes software.

13. The system according to claim 11, wherein the device executes software to mark the first plurality of source code classes with the first marker;

compile the first plurality of source code classes;

identify the compiled classes as marked with the first marker;

for each identified compiled class, add the first interface to the identified compiled class to serialize data associated with the instance of the identified compiled class; and for each identified compiled class, add the second interface to the identified compiled class to deserialize serialized data associated with the instance of the identified compiled class.

14. The system according to claim 11, wherein the first interface is to store the serialized data in a data structure in association with the instance of the identified compiled class, and wherein the second interface is to retrieve the serialized data from the data structure.

15. The system according to claim 11, wherein the device is further to:

mark a second plurality of source code classes with a second marker;

compile the second plurality of source code classes;

identify the second compiled classes as marked with the second marker; and for each identified second compiled class, add a third interface to the identified second compiled class to track synchronization information associated with an instance of the identified second compiled class.

16. The system according to claim 15, wherein the first plurality of classes and the second plurality of classes are not mutually exclusive.

17. The system according to claim 15, wherein the identify the compiled classes as marked with the first marker comprises:

identify a first byte code associated with each of the compiled classes, the first byte code associated with the first marker, and wherein the identify the second compiled classes as marked with the second marker comprises:

identify a second byte code associated with each of the second compiled classes, the second byte code associated with the second marker.

* * * * *